United States Patent
Weise

[11] 3,794,246
[45] Feb. 26, 1974

[54] THRUST REVERSING CASCADE ASSEMBLY

[75] Inventor: Carl A. Weise, San Pedro, Calif.

[73] Assignee: Aeronca, Inc., Middletown, Ohio

[22] Filed: Apr. 11, 1973

[21] Appl. No.: 350,088

[52] U.S. Cl............................ 239/265.33, 60/229
[51] Int. Cl......................... F02k 1/20, B64c 15/06
[58] Field of Search..... 239/265.19, 265.25, 265.31, 239/265.33; 60/226, 229, 230

[56] References Cited
UNITED STATES PATENTS

| | | | |
|---|---|---|---|
| 3,603,090 | 9/1971 | Billinger et al. | 239/265.31 X |
| 3,616,648 | 11/1971 | Weise | 239/265.31 X |

Primary Examiner—Allen N. Knowles
Assistant Examiner—Michael Y. Mar
Attorney, Agent, or Firm—Wood, Herron & Evans

[57] ABSTRACT

A lightweight, easily manufactured and assembled thrust reversing cascade assembly for jet engines. The assembly includes a plurality of turning vanes positioned in spaced relation and locatable aft of a jet engine exhaust. Each turning vane is rigidly supported in fixed spacial relation to other such turning vanes by a support assembly which includes a plurality of planar spacer members. Each spacer member includes a tab portion which extends from the spacer body a distance sufficient to pass through a slot in a turning vane. Each spacer also includes a notch on the end opposite the tab to receive the tab projecting through a turning vane from another spacer member. A pair of straps are positioned on both sides of the planar spacer members and also extend through the slots in each turning vane. Tensioning means is provided at opposite ends of the straps to place the straps in tension while providing compression forces on the spacers and turning vanes to rigidly support the turning vanes in spaced relation.

7 Claims, 8 Drawing Figures

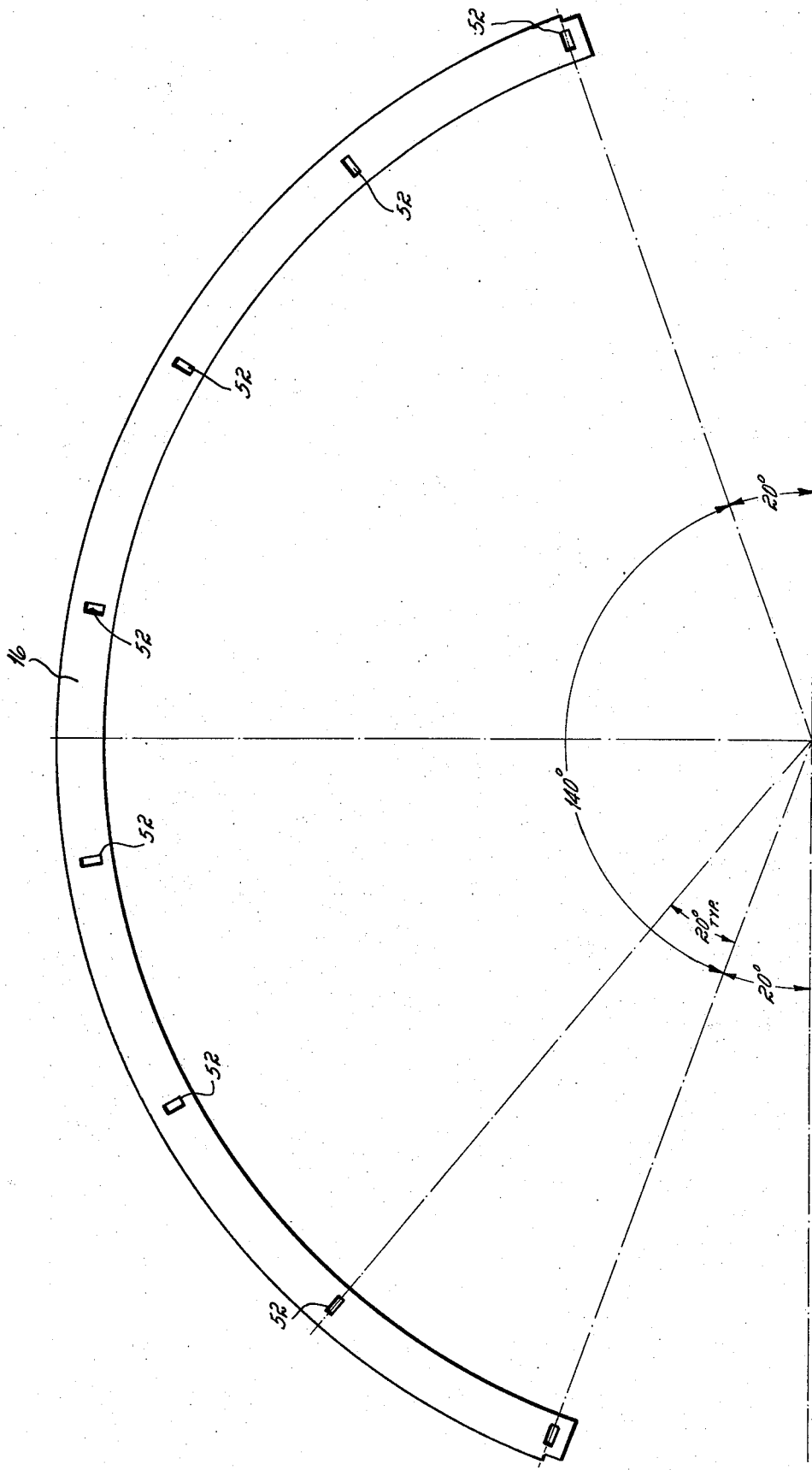

THRUST REVERSING CASCADE ASSEMBLY

BACKGROUND OF THE INVENTION

This invention relates broadly to jet engine thrust reversers and particularly to jet engine thrust reversers of the cascade type.

In most jet aircraft, it is conventional to provide thrust reversing devices for spoiling and/or reversing the thrust of the aircraft engines during landing, decelerating and taxiing. One type of thrust reverser frequently utilized includes a pair of clam shells, or buckets, which are disposed rearwardly and externally of the jet engine. The clam shells or buckets, when so disposed, provide a surface for redirecting the jet engine exhaust and thereby producing the thrust reversal. Thrust reversers of this type, however, impose high loads on the engine itself and make flying hazardous if they should be inadvertently deployed during flight. In addition, due to the heavy loads and the large size of the clam shells or buckets, such thrust reversing mechanisms are heavy.

A second type of thrust reversing mechanism in commercial use today includes a cascade assembly normally mounted in or forming a part of the jet engine duct. Means are provided for covering and sealing these cascade assemblies during normal operation of the engine. When the engine is reversed, however, the cascades are uncovered and some form of blocker element is disposed to divert the main engine stream outwardly through the cascades. In other cascade-type reversers, the cascades are shifted aft of the jet engine exhaust when thrust reversal is desired.

The cascade type of thrust reversing mechanism frequently requires heavy component parts in order to assure that the thrust reversing mechanism will operate without being damaged by the forces exerted thereon by the jet exhaust. The added weight for such cascade assemblies is especially disadvantageous because the payload of the aircraft is reduced by many times the amount of weight associated with the thrust reversing mechanism itself.

In light of the foregoing, the principal object of this invention is to provide a lightweight thrust reversing cascade assembly for jet engines formed of interfitting, sheet metal components. The present cascade assembly is highly advantageous since it is not only economical to produce; but also substantially increases the payload of an aircraft by materially reducing the weight of the thrust reverser.

It is a further object of this invention to provide a thrust reverser of the cascade type wherein the cascade assembly is itself formed of lightweight and relatively inexpensive components which are readily assembled to provide a thrust reversing assembly lighter in weight and less expensive than previous assemblies.

In one preferred form, the present thrust reversing cascade assembly includes a plurality of arcuate turning vanes constructed of thin sheet metal. Each such turning vane is provided with a plurality of slots passing completely therethrough and substantially evenly distributed along the length thereof. Each of the turning vanes is positioned in parallel spaced relation to the other turning vanes by sheet metal spacer members. Each spacer member is provided with a tab which extends from the body of the spacer through the slot in a turning vane. Each spacer member is also provided with a notch for receiving the tab portion of an adjacent spacer member which extends through a turning vane disposed between the two spacers. A pair of straps are positioned on opposite sides of each spacer member, the straps also passing through the slots in the turning vanes. The straps lock the spacers between the turning vanes and provide lateral stability to the assembly. At opposite ends of the straps are tensioning means joined to the two endwise mounting rings which are carried by the jet engine. The tension straps function to secure the entire cascade assembly together with the mounting rings. The cascade assembly so produced is rigid and lightweight and results in a thrust reverser which is lighter in weight and less expensive to assemble and maintain than previously known thrust reversers.

One principal advantage of a thrust reverser cascade assembly of the type described is that the cascade assembly itself is formed from lightweight components. For each pound of weight saved in the cascade assembly itself, a multiple number of pounds of aircraft payload can be carried by aircraft.

Another advantage achieved by this invention is that the cascade assembly itself can be easily manufactured from relatively inexpensive components. The individual components of the cascade assembly itself are typically made of sheet metal material which have been stamped out on a stamping press. As such, the individual components are easily constructed from inexpensive materials.

Yet another advantage of this invention is that the thrust reversing cascade can be assembled without the use of special tools or requiring welding apparatus. Still another advantage of this invention is that the thrust reversing cascade is a modular construction thereby permitting easy dismantling for modification or repair without requiring special tooling or high cost.

A further advantage of this invention is that the cascade assembly, being constructed of sheet metal components, can be formed of elements exactly the thickness required for the given thrust reversing application and thereby avoid the heavy weight construction frequently associated with known thrust reversers.

These and other objects and advantages of the present invention will be more readily apparent from the following detailed description of the drawings illustrating a preferred embodiment of the invention.

DESCRIPTION OF THE DRAWINGS

FIG. 8 is an elevational view of a vane.

DETAILED DESCRIPTION

Figure 1:
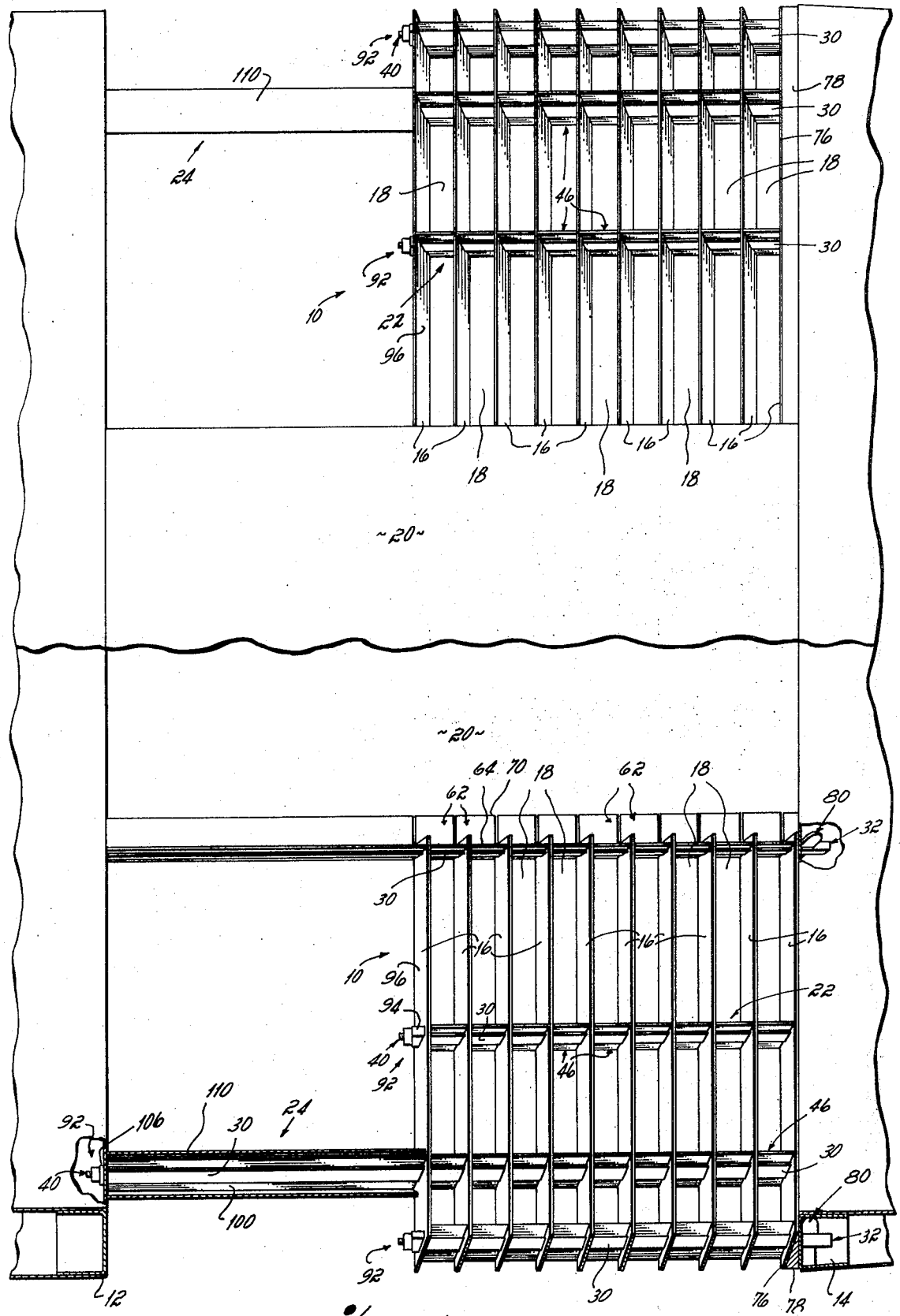
FIG. 1 is a side elevational view partially cut away showing an assembled cascade assembly of the type characterized by this invention.

One preferred form of a thrust reversing cascade assembly constructed in accordance with this invention is shown generally by numeral 10 in FIG. 1. This assembly may be utilized in connection with various types of thrust reversers. For example, the assembly may be fixedly mounted with respect to the jet engine exhaust with flow through the cascade being controlled by shifting the blocker panels or the like. In other installations, the cascade assembly may be shiftable fore and aft with respect to the jet engine exhaust.

In one form of this invention, the cascade assembly 10 is rigidly mounted between a forward mounting ring 12 and a rear mounting ring 14. These mounting rings 12 and 14 may be rigidly secured to the jet engine frame or, in an alternative form, may be movable with respect to the jet engine frame so that the cascade assembly may be shifted rearwardly during periods of thrust reversal. Further means, not shown, are provided to cooperate with the cascade assembly 10 to direct the jet engine exhaust therethrough and thereby produce the desired engine thrust reversal. These cooperating elements, while being necessary to produce the desired thrust reversal, are not part of this invention, and various types are well known in the art. For example, the thrust reverser described by C. A. Weise, U.S. Pat. No. 3,616,648, might utilize the cascade assembly of this invention and includes description of one type of cascade thrust reverser including cooperating elements to direct the jet engine exhaust through the cascade.

The cascade assembly 10 includes a plurality of turning vanes 16 disposed in parallel spaced relation with each other and transversely of the longitudinal axis of the jet engine to provide a plurality of exhaust-directing chambers shown generally as 18 for directing the jet engine exhaust in a generally outward and forward direction when diverted through the cascade assembly by an exhaust blocker means not shown. Each turning vane 16 for the embodiment shown in FIG. 1 is an arcuate strip member, most advantageously shown in FIG. 8, extending over approximately 140° of the circumference of a circle. The ends of vanes 16 are located adjacent the two solid panels 20 which may enclose rails or other parts of the thrust reverser mechanism. As viewed in FIG. 1, the thrust reversing cascade actually includes an upper and a lower set of arcuate turning vanes 16 spanning the upper and lower openings between the two side panels 20.

Each of the turning vanes 16 of a set is rigidly supported in parallel spaced relation to the remaining turning vanes by two types of vane support assemblies. Both types of support assemblies extend in a fore and aft direction parallel to one another and transverse to the individual vanes 16. The first type of vane support assembly, shown generally as 22, is rigidly secured to the rear support ring 14 and further provides a plurality of spacers, hereinafter described in greater detail, to rigidly support the turning vanes 16 in their spaced relation as shown. The vane support assembly 22, however, does not extend the whole distance between the rear mounting ring 14 and the forward mounting ring 12.

The second type of vane support assembly, shown generally as 24, provides a rigid support for the turning vanes 16 and also provides a rigid connection between the rear mounting ring 14 and the forward mounting ring 12. As such, the second vane support assembly 24 is a means for locating the turning vanes in fixed relation between the rear mounting ring 14 and the forward mounting ring 12.

Figure 4:
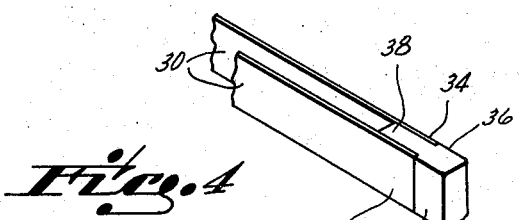

The principal component parts of the turning vane support assembly are shown in FIGS. 4–7. FIG. 4 shows one end of two tension straps or bands 30 in parallel spaced relation which are fixedly secured to a T-shaped end fitting 32. Each of the tension bands 30 is constructed of suitable material preferably a lightweight metal, such as stainless steel 0.032 inches thick, having the necessary strength and fatigue resistance for application in a thrust reversing cascade. The tension straps 30 are welded or otherwise fixedly secured to the end fitting 32, the latter being shaped so that the outer surface 34 of each strap 30 is coextensive with the surface 36 of the end fitting 32. The portion 38 of the end fitting 32 which is disposed between the straps 30, as will become more clear from later discussion, must be substantially the same thickness as the spacer members in order to permit the spacer members to be located in the gap between the two straps 30.

Figure 5:
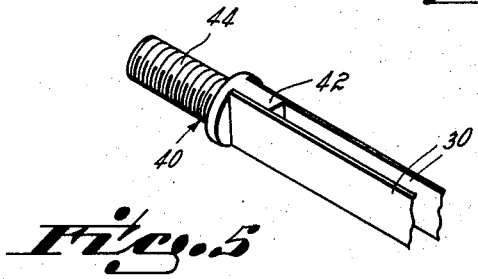
FIGS. 4 and 5 show the tension straps and the end fittings therefore.

The opposite end of the tension strap assembly is shown in FIG. 5. The straps 30 are shown in parallel spaced relation to each other and are fixedly connected, by welding or other suitable connection, to the threaded end fitting 40. Like the end fitting 32, the threaded end fitting 40 includes a region 42 disposed between the two tension straps 30 to insure that the straps 30 are maintained in a spaced relation and also at a distance which is substantially equal although slightly larger than the width of the spacer members. The end fitting 40 also includes a threaded portion 44 which, as hereinafter described, is provided to place the tension straps 30 under tension when all of the elements of the vane support assembly are in position.

Figure 6:
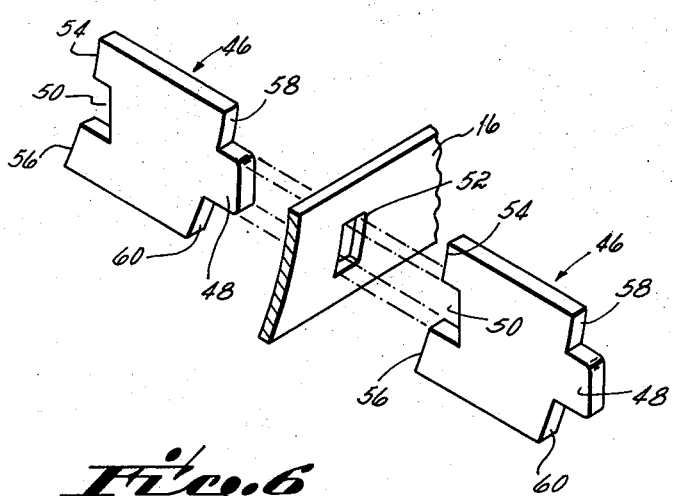
FIG. 6 is an exploded perspective view of two spacer members and a slotted turning vane illustrating the method in which these parts interfit to form a completed assembly.

Referring now to FIG. 6, two vane spacers 46 are shown in an exploded perspective view with a portion of a turning vane 16 disposed therebetween. Each of the vane spacers 46 is preferably formed from a stamping of a sheet metal, such as stainless steel 0.060 inches thick, to produce the substantially planar body shown. Each vane spacer 46 includes a tab portion 48 which extends outwardly from one end of the spacer 46. At the opposite end of each spacer 46 from the tab 48 is a notch 50 which is shaped to receive in interfitting manner the tab portion 48 of another spacer 46. End tab portion 48 extends outwardly from the main body of the spacer 46 a distance sufficient so as to extend through a slot 52 in a turning vane 16 and into the notch 50 of a spacer 46 disposed on the opposite side of the turning vane.

As hereinabove described, each turning vane 16 may be formed of a suitable material, such as stainless steel sheet metal 0.060 inches thick, and may be formed by stamping. In the process of stamping the vane 16, the slots 52 may also be formed. The slots 52, as hereinafter described, have a shape and size sufficient to accommodate not only a tab member 48 but is also large enough to permit two tension straps 30 to also pass therethrough. Furthermore, as indicated in the drawings, each turning vane may have a curved shape in cross-section, this curvature is provided in order to more easily reverse the thrust of the jet engine by providing a curved gas deflecting surface to direct the engine exhaust outwardly with a forward component.

Because of the great pressure placed upon the turning vanes 16 when the thrust of the jet engine is reversed, there are forces applied to each turning vane 16 which tend to straighten out the curvature of the vanes 16. To prevent this straightening of the vanes 16, the vane support surfaces 54 and 56 of each spacer 46 are shaped to conform to the opposite surfaces of the turning vanes 16 when the spacer members are positioned in their vane-supporting arrangement. In similar manner, the vane support surfaces 58 and 60 of each spacer 46 are also shaped to conform with the opposite surfaces of a turning vane 16. As such, the end faces of two spacers 46, when disposed in a vane-supporting relationship, provide a means for not only spacing adjacent turning vanes 16 but also provide vane support surfaces in engagement with substantial areas of each vane 16 to prevent the straightening of the vane 16 by the forces exerted thereon by the jet exhaust during thrust reversal.

Figure 7:
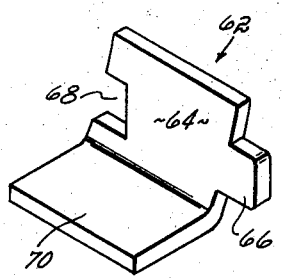
FIG. 7 is a perspective view for an end spacer member.

Referring now to FIG. 7, an L-shaped, single piece spacer member 62 is shown. This spacer member includes a body portion 64 substantially identical to that of a spacer 46. The body member 64 includes a tab 66 extending from one end of the body with a notch 68 on the other end. The spacer body 64, the tab portion 66, and notch portion 68 are substantially identical to the spacer members 46. As shown in FIG. 7, however, a horizontal portion 70 is additionally included, the horizontal portion being disposed substantially in perpendicular relation to the main body portion 64. The L-shaped spacer 62 is also made by stamping sheet metal of appropriate material and subsequently bending the portion 70 into a different plane than that of the main body 64. The spacers 62 are used only at the extreme ends of the turning vanes 16 as shown in FIG. 1. The portion 70 is disposed on the inner side of each side blocker panel 20 to provide a seal, preventing gases from passing between the side blocker panel 20 and the endmost vane spacer assembly with vane spacers of the type shown in FIG. 7. In addition, these portions 70 also provide radial support for each of the cascade assemblies to resist forces exerted thereon by the jet engine exhaust as it passes through the cascade.

Figure 2:
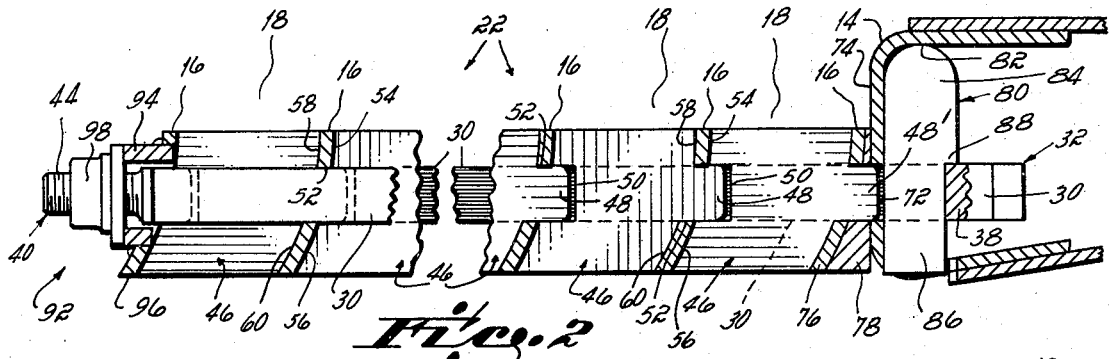
FIG. 2 is a partial side elevational view of the vane support structure with the vanes shown in section.

Referring now to FIG. 2, a vane support assembly of the first type 22 is shown in greater detail. A plurality of turning vanes 16 are disposed along the length of the support assembly 22 in parallel spaced relation to each other, the spacing being provided by vane spacer members 46. These spacer members 46 are disposed so that the end faces 54, 56, 58 and 60 are in abutment with the adjacent surfaces of turning vanes 16. The spacers 46 are positioned so that each tab portion 48 extends through a slot in the adjacent turning vane 16 and into the notch 50 of a spacer 46 disposed on the opposite side of that turning vane.

At the rightmost end of the support assembly, as viewed in FIG. 2, the tension straps 30 pass through an opening, shown generally at 72, in the rear mounting ring 14. Spaced between the forward surface 74 of the rear mounting ring 14 and the rightmost turning vane 76 is a spacer member 78 whose rightmost surface, as viewed in FIG. 2, is planar and coextensive with the surface 74. The leftmost or forward surface of the spacer 78 is shaped to be coextensive with the rear surface of the turning vane 76. As such, the spacer 78 provides a solid member for supporting the rightmost turning vane 76 by the rear mounting ring 14. The spacer 78 has a plurality of slots positioned along the length thereof in alignment with the slots in the turning vanes so that, by way of example, tab portions such as 48' can extend through the slots in the rightmost turning vane and through the aligned slots in spacer 78. The slots in the spacer 78 are also sufficiently large to accommodate tension straps 30. The spacer 78 is preferably formed by a simple casting of stainless steel.

Disposed on the right side of the rear mounting ring 14 is a retaining pin 80 which extends upwardly to the upper surface of the rear retaining ring 14 as shown generally at 82. The upper portion 84 of the retaining ring 80 extends from the uppermost edge of the tension straps 30 to the point 82 so as to prevent the retaining pin 80 from moving upwardly when urged by vibrations or other forces exerted thereon during thrust reversal operation or even normal operation of the jet engine to which the cascade assembly is connected.

The lower portion of the retaining pin 80 shown generally as 86 extends downwardly from the upper edge of the tension straps 30 to a point well below the lower edge of the straps 30. The lower portion 86 is disposed between the two tension straps 30 to prevent the strap assembly from being pulled leftwardly through the opening 72 in the rear mounting ring 14. The retaining pin 80 also includes a rearwardly extending flange 88 which is disposed directly above the portion 38 of the end fitting 32. This rearwardly extending flange 88, when positioned directly above the portion 38 as shown, prevents the retaining pin 80 from moving downwardly from the position shown when urged by vibrational and other forces associated with normal and thrust reversing operations of the jet engine to which the cascade is connected. As such, the retaining pin 80 provides an easily disconnectable though sturdy means for securing the vane support assembly to the rear mounting ring 14.

Located at the opposite end of the vane support assembly shown in FIG. 2 from the retaining pin 80 is a tensioning means shown generally as 92 for placing the tension straps 30 under tension and for placing the vanes 16 and the spacers 46 under compression. The tensioning means 92 includes a boss 94 which is welded to the leftmost turning vane 96. The boss is formed from a tubular body and has a left face formed by cutting the tubular body along a plane perpendicular to the axis thereof and a rear face formed by cutting the tube along a plane disposed at an oblique angle to the axis of the tube. As such, the boss 94 may be welded to the leftmost turning vane 96 in a manner so that the leftmost face of the boss 94 will be disposed in a plane perpendicular to the axis of the threaded portion 44 which extends leftwardly therethrough. A threaded nut 98 threadably engages the threaded portion 44 and is tightened down against the leftmost face of the boss 94. By tightening the nut 98, the tension straps 30 will be placed under tension while the spacers 46 and turning vanes 16 are placed under compression, thereby providing the forces necessary to maintain the turning vanes in fixed space relation with respect to each other and with respect to the rear mounting ring 14.

Figure 3:
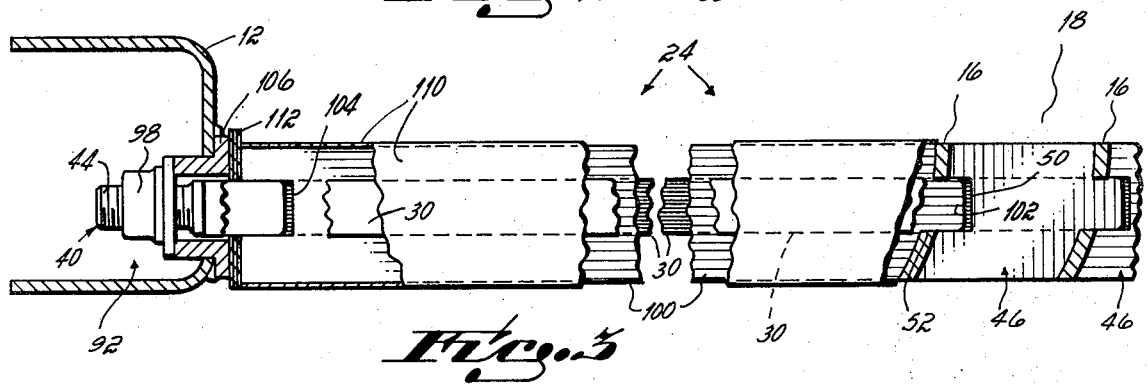
FIG. 3 is a partial side elevational view of the vane support structure including the forward mounting ring and associated vane support apparatus.

Referring now to FIG. 3, a vane support assembly of the second type 24 is shown in part. The vane support assembly 24, although not shown, connects to the rear mounting ring 14 in the same manner as for assembly 22. This assembly 24 differs from the assembly 22 shown in FIG. 2 in that there is a direct connection between the leftmost turning vane 96 and the forward mounting ring 12. To accomplish this, a spacer member 100 is provided, extending substantially between a forward mounting ring 12 and the forward surface of the leftmost or forwardmost turning vane 96. This spacer member 100, like the other spacer members 46, is made of sheet metal material and also includes a tab portion 102 which extends rearwardly from the main portion of the spacer 100 so as to extend through the slot in the forwardmost turning vane 96 and extend into the notch 50 in the spacer 46 disposed on the opposite side of the turning vane 96. On the opposite end of the spacer 100 is a notch 104 for receiving the portion 42 of the threaded end fitting 40 when the spacer 100 is disposed between the two tension straps 30.

The vane support assembly 24 includes a boss 106 which is welded to the forward mounting ring 12. The boss 106 is a substantially tubular body extending through the forward mounting ring 12. Passing through the center of the boss 106 is the threaded portion 44 of the end fitting 40. A nut 98 threadably engages the threaded portion 44 to place the tension straps 30 under tension and also to place the spacers 46 and 100 and the turning vanes 16 under compression and thereby provide a rigid support assembly spanning between the forward support ring and the rear support ring 14 (not shown).

Between the forwardmost turning vane 96 and the forward mounting ring 12 and surrounding the spacer 100 is a tube 110 which adds more rigidity to the support assembly between the turning vane 96 and the forward mounting ring 12 and also provides a protective shield around the support assembly in this region. To assure that the tube 110 is fixedly located between the turning vane 96 and the forward mounting ring 12, a plurality of shims 112 are disposed between the leftmost end of the tube 110 and the boss 106. The number of shims 112 that will be necessary is entirely dependent upon the machining tolerance of the tube 110 and may not be necessary if the tube dimensions exactly fit the distance between the boss 106 and the turning vane 96.

As is evident from the foregoing description, most of the parts forming the main support assembly can be readily manufactured from sheet metal by stamping out the part on a metal stamping press. Furthermore, because the parts are individually quite small, they are more easily handled prior to assembly. In addition to the foregoing advantages of the vane support assembly described, there is very little welding in the whole assembly. Additionally, what weldings are required may be made prior to the actual assembly of the cascade itself. In fact, once all the parts have been welded, the cascade can be assembled virtually at any time with a tool no more complicated than a torque wrench, the latter being advisable in order to tighten the nuts 98 and thereby tension the straps 30 to a predetermined tension.

While the foregoing description of a thrust reversing cascade assembly for jet engines has been made with particular emphasis upon a preferred embodiment thereof as described in the drawings, it will be clear to those of skill in the art that numerous changes may be made without departing from the spirit and scope of this invention. By way of example, in the embodiment illustrated in the drawings, the cascade assembly is carried by both a rear mounting ring 14 and a forward mounting ring 12. In an alternate form of the invention, the cascade assembly can be mounted entirely upon the aft mounting ring 14 with no connections being made to a forward mounting ring. In this embodiment, no members extend forwardly of the leftmost or forwardmost turning vane 96.

In this modification all vane support assemblies are like vane support assembly 22, i.e., they extend between forwardmost vane 96 and rear support ring 14. In this modification, as in the preferred embodiment, the vanes are held in spaced parallel relationship by spacers 46 and the entire assembly is secured together by means of tension straps 30. The straps 30 are tensioned by means of nuts 98 threaded over portions 44 and engaging bosses 94 mounted on the forwardmost vane 96 as shown in FIG. 2.

It should also be noted that while directions have been mentioned with respect to various parts, these directions have been made purely for descriptive purposes and are not intended in any way to be descriptive of all possible arrangements encompassed by this invention as described in the following claims.

What is claimed is:

1. A cascade assembly for jet engine thrust reversers comprising, in combination:
    a plurality of arcuate vane members, each vane member being a strap and having a plurality of spaced slots formed therein;
    a plurality of spacers for spacing and rigidly supporting said vanes in parallel spaced relation, each said spacer including a tab member disposed on one end thereof and a corresponding slot disposed on the opposite end thereof, said tab and slot being shaped to interfit with another identically shaped spacer, said tab extending from said spacer a distance sufficient to pass through a slot in one of said vanes and interfit with a notch of another spacer disposed on the opposite side of the vane;
    a pair of tension straps disposed on opposite sides of said spacers and passing through the slots in the turning vanes; and
    a strap tensioning means for placing said straps under tension and said spacers under compression.

2. The cascade assembly in claim 1 wherein said vanes, said spacers and said tension straps are formed from stampings of lightweight sheet metal.

3. The cascade assembly of claim 1 additionally including
    an end fitting fixedly secured to the ends of said tension straps, said end fitting including a portion disposed between said straps to dispose said straps in parallel spaced relation.

4. A cascade assembly for jet engine thrust reversers comprising in combination:
    a forward and aft support ring;
    a plurality of slotted vanes, each of said vanes being arcuate in shape and of a curved cross-sectional configuration;
    a plurality of vane spacer members, each spacer member comprising a substantially planar body formed of lightweight sheet metal and having a body portion for maintaining the vanes in spaced relation, said body having a notch on one end thereof and an extending tab portion on the end opposite said notched end, said tab portion extending from said body a distance sufficient to extend through a slot in a turning vane to fit into the notch of another identical spacer member disposed on the opposite side of a turning vane;

a pair of tension straps disposed on opposite sides of said spacer members and also passing through the vane slots;

means for supporting at least some of said tension straps on said fore and aft support rings; and means for tensioning said tension straps to cause said spacer members disposed between said straps to be under compression, said vanes being supported thereby in parallel spaced relationship, and in general parallelism with said fore and aft support rings.

5. A cascade assembly for jet engine thrust reversers comprising, in combination:

a forward and an aft support ring;

a plurality of arcuate vanes formed from a stamping of lightweight sheet metal, each said vane having a plurality of substantially evenly spaced slots therethrough, each said vane additionally being bent from a planar shape to present a concave and convex surface for directing the jet exhaust in a forward direction;

a plurality of vane spacer members each disposed between two said vanes for spacing and rigidly supporting in spaced relation each of said vanes, each spacer being formed from a stamping of lightweight sheet metal and including one end shaped to conform to said concave surface of a vane and the opposite end shaped to conform to said convex surface, one of said ends including an extending tab member and the other of said ends including a notch portion shaped to interfit with tab members of other spacers, each said tab member extending from said spacer a distance sufficient to penetrate through a slot in a vane and interfit with a slot of another vane spacer disposed on the opposite side of the penetrated vane;

a plurality of pairs of parallel spaced tension straps formed from a stamping of lightweight sheet metal disposed through each said slot in each said vane, said straps being disposed on opposite sides of said spacer members;

an end fitting fixedly secured at one end of each said pair of tension straps and engaging said aft support ring to rigidly position said straps in parallel spaced relation;

a threaded end fitting fixedly secured to the end opposite said end fitting of each pair of tension straps to also position said straps in parallel spaced relation, at least some of said threaded end fittings engage said forward support ring; and thread engaging means for engaging each said threaded end fitting to tension said pair of tension straps and place said spacers disposed between said straps under compression.

6. A cascade assembly for jet engine thrust reversers comprising in combination:

an aft support ring;

a plurality of slotted vanes including a forwardmost vane, each of said vanes being arcuate in shape and of a curved cross-sectional configuration;

a plurality of vane spacer members, each spacer member comprising a substantially planar body formed of lightweight sheet metal and having a body portion for maintaining the vanes in spaced relation, said body having a notch on one end thereof and an extending tab portion on the end opposite said notched end, said tab portion extending from said body a distance sufficient to extend through a slot in a turning vane to fit into the notch of another identical spacer member disposed on the opposite side of a turning vane;

a pair of tension straps disposed on opposite sides of said spacer members and also passing through the vane slots;

means for supporting said tension straps on said aft support ring; and means for tensioning said tension straps to cause said spacer members disposed between said straps to be under compression, said vanes being supported thereby in parallel spaced relationship, and in general parallelism with said fore and aft support rings.

7. The cascade assembly of claim 6 further comprising:

an end fitting fixedly secured at one end of each said pair of tension straps and engaging said aft support ring to rigidly position said straps in parallel spaced relation;

a threaded end fitting fixedly secured to the end opposite said end fitting of each pair of tension straps to also position said straps in parallel spaced relation, said threaded end fittings engaging said forwardmost vane; and threaded engaging means for engaging each said threaded end fitting.

* * * * *

UNITED STATES PATENT OFFICE
CERTIFICATE OF CORRECTION

Patent No. 3,794,246   Dated February 26, 1974

Inventor(s) Carl A. Weise

It is certified that error appears in the above-identified patent and that said Letters Patent are hereby corrected as shown below:

Column 10, line 45 "threaded" should be

-- thread --

Signed and sealed this 16th day of July 1974.

(SEAL)
Attest:

McCOY M. GIBSON, JR.  C. MARSHALL DANN
Attesting Officer     Commissioner of Patents